United States Patent [19]

Pelloux-Gervais

[11] Patent Number: 4,479,359

[45] Date of Patent: Oct. 30, 1984

[54] ATMOSPHERIC HEATERS

[75] Inventor: Pierre Pelloux-Gervais, Grenoble, France

[73] Assignee: L'Air Liquide, Societe Anonyme Pour L'Etude et L'Exploitation des Procedes Georges Claude, Paris, France

[21] Appl. No.: 576,793

[22] Filed: Feb. 6, 1984

Related U.S. Application Data

[63] Continuation of Ser. No. 304,635, Sep. 22, 1981, abandoned.

[30] Foreign Application Priority Data

Oct. 1, 1980 [FR] France ............................ 80 21003

[51] Int. Cl.³ .............................................. F17C 7/02
[52] U.S. Cl. ........................................ 62/52; 165/133; 165/179; 165/183
[58] Field of Search ................... 62/52, 50; 165/133, 165/179, 181, 183

[56] References Cited

U.S. PATENT DOCUMENTS

| | | | |
|---|---|---|---|
| 2,281,206 | 4/1942 | Schoen | 257/148 |
| 2,322,341 | 6/1943 | Booth | 257/148 |
| 3,124,940 | 3/1964 | Guelton | 62/52 |
| 3,267,564 | 8/1966 | Keyes | 29/157.3 |
| 3,293,871 | 12/1966 | Tyree, Jr. | 62/52 |
| 3,735,465 | 5/1973 | Tibbetts et al. | 62/52 |
| 4,136,428 | 1/1979 | Godsey et al. | 165/133 |
| 4,180,055 | 12/1979 | Hudnall | 126/446 |

FOREIGN PATENT DOCUMENTS

| | | |
|---|---|---|
| 1642959 | 6/1971 | Fed. Rep. of Germany . |
| 2633862 | 2/1978 | Fed. Rep. of Germany . |
| 716972 | 12/1931 | France . |
| 1034493 | 7/1953 | France . |
| 1154124 | 5/1955 | France . |
| 71777 | 10/1960 | France . |
| 1475915 | 2/1967 | France . |
| 2028806 | 10/1970 | France . |
| 2096919 | 3/1972 | France . |

Primary Examiner—Ronald C. Capossela
Attorney, Agent, or Firm—Young & Thompson

[57] ABSTRACT

The invention relates to an atmospheric heater particularly for cryogenic fluids. Examples of cryogenic fluids which can be heated are liquified nitrogen and liquified oxygen.

15 Claims, 4 Drawing Figures

4,479,359

ATMOSPHERIC HEATERS

BACKGROUND OF THE INVENTION

This application is a continuation of application Ser. No. 304,635 filed Sept. 22, 1981 now abandoned.

The present invention relates to atmospheric heaters of the kind comprising a plurality of tubes arranged to be traversed by the fluid which is to be heated and which is provided with external and internal heat-transfer fins. Hereinafter, such heaters will be referred to as "of the kind described".

Heaters of the kind described having heating tubes of this nature can be shown to have an inadequately efficient heat exchange, in particular when the fluid is in the two-phase condition; it has proved possible to establish that this lack of efficiency stems from the fact that the radial length of the internal fins, which generally does not exceed 0.4R, R being the internal tube radius, was largely insufficient, so that the liquid phase of the liquid which is to be heated flows principally along a central section of the tube, with the result that its heat exchanges with the fins are thereby reduced considerably.

It is an object of this invention to provide a heater of the kind described, which has a higher heat exchange efficiency for diphasic fluids.

SUMMARY OF THE INVENTION

This and other objects are achieved by extending at least two internal fins of each tube radially towards the tube axis for a length of at least 0.6R, whereas the other internal fins have radial lengths of between 0.2R and 0.5R, where R is the internal radius.

The radial length of at least some internal fins allows of direct contact in all cases between the liquid phase of the fluid which is to be heated and the heat conduction fins. These latter, as well as the tube, are preferably made of aluminum or aluminum alloy. In particular cases, in particular if the internal diameter of the tube exceeds 20 mm, the radial extension of the internal fins is equal to R, which means in practice that the tube is divided longitudinally into two or more mutually separate passages. As a rule however, the radial extension of the internal fins amounts to less than 0.9R.

For some purposes, at least two radially extending external fins arranged symmetrically may each be extended by two branching webs which extend in directions which are parallel such that the distance between the extremities of two fin webs is substantially equal to the distance between the extreme edges of the two non-extended adjacent fins, or else to the distance between the extreme edges of an extended fin and of a non-extended fin. An increase is observed moreover of the heat transfer efficiency without this leading to an increased bulk in all directions. The passages for atmospheric air flow retain a constant opening towards the surrounding environment, which ensures maximum efficiency.

BRIEF DESCRIPTION OF THE DRAWINGS

In order that the invention may be more clearly understood, reference will now be made to the accompanying drawings which show certain embodiments thereof by way of example and in which.

DETAILED DESCRIPTION OF PREFERRED EMBODIMENTS

Figure 1:
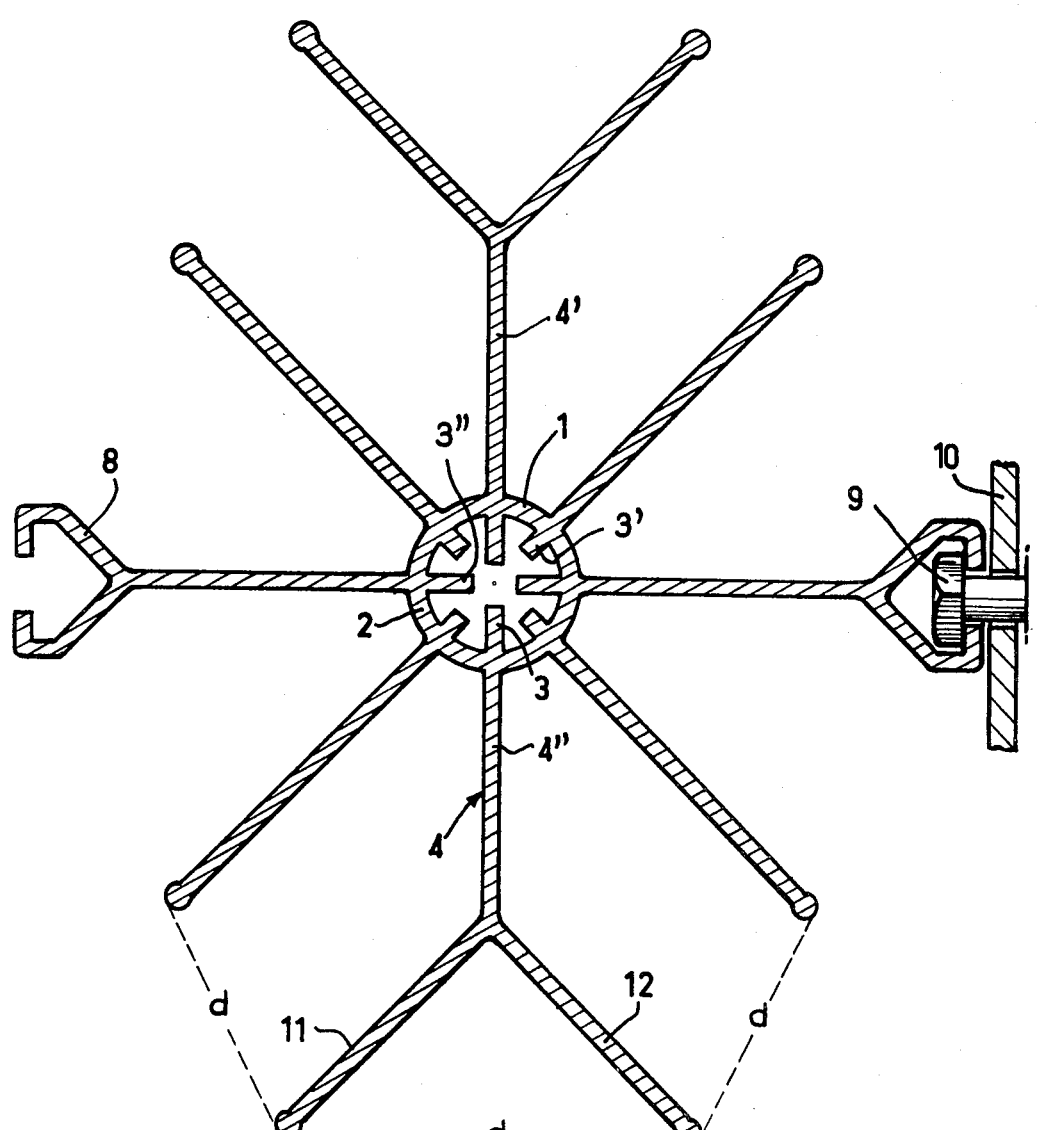
FIG. 1 is a cross-section through a first embodiment of heating tube in accordance with the invention.

Referring to FIG. 1, a heating tube 1 forming part of a large number of such tubes connected in series or in parallel, is formed by a cylindrical core 2 comprising internal fins 3 and external fins 4.

Figure 2:
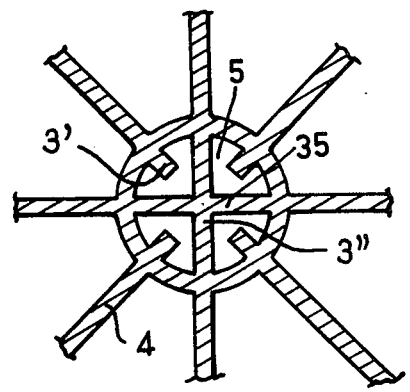
FIG. 2 is a partial view similar to that of FIG. 1, of a second embodiment.

In this embodiment, the internal fins 3 are of two kinds and although eight of them are shown, this number may be changed at will. Some of the fins, e.g. four fins 3'' as shown, extend radially for a distance of between 0.2R and 0.5R, typically 0.4R or less, where R is the internal radius of the tube, whereas the remaining fins 3'' have a greater radial extent. This radial length lies between 0.6R and 0.9R in the case of the embodiment shown in FIG. 1, but in some cases, as shown in the embodiment of FIG. 2, it may amount up to R so that the extended fins 3'' in that embodiment then form partitions separating the tube into four separate internal passages 5 each of which has a short internal fin 3'. The external fins 4 are also of two kinds in this case, some having a conventional radial length and some of them terminating in a slotted rail-like profile enabling a bolt 9 to be enclosed for attachment to a support 10. Some of these fins, for example two opposed fins 4' and 4'', are divided at a radial distance a little shorter than the radial length of the other fins, into two divergent webs 11 and 12 which preferably extend in directions parallel to the non-extended adjacent fin and for a length such that the intake cross-section of the passage between two adjacent fins, or between two adjacent webs, or between a web and a fin, which is denoted by d in the drawings, is substantially constant which promotes optimum uniformity of the heat exchanges.

Figure 3:
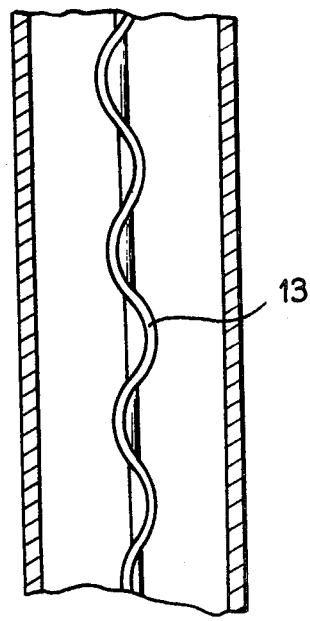
FIG. 3 is a partial view in axial cross-section of the heating tube.

Referring now to FIG. 3, it will be apparent that for complementary promotion of the heat exchanges, provision has been made for each internal fin 13, no matter whether it is of greater or lesser radial extent, or a part only of these fins, to have transverse corrugations as illustrated in the drawing, which thus provides a turbulent action particularly favourable to heat exchange. The corrugations preferably have a pitch of between 0.4 and 2R.

Other expedients may be employed to enable the coefficient of heat exchange with the outside to be increased, for example:

One or more external fins may be coloured black by painting or anodisation so as to secure greater absorption of solar or ambient energy due to the increase in the emissivity of its surface. It has been determined that this arrangement allows more than 150 w/m$^2$ of surface area to be gained on sunless days, and more than 1,000 w/m$^2$ of surface area during sunny periods. The fins situated farthest downstream with respect to the flow of the fluid which is to be heated will preferably be treated in this manner, since there is no rime in this section and rime could interfere with the action referred to above.

A forced draught device such as a blower or turbine driven by a pneumatic motor, fed by the heated gas, will advantageously be installed on the last or the penultimate array of exchange tubes, which allows of maintaining total independence of the heating devices from any external energy source.

A film of plastics material, for example of bioriented polyethylene, is preferably placed in position on the fins of the tubes situated at the most upstream position with respect to the direction of flow of the fluid which is to be heated, which induces a slight thermal resistance between the air and the fin thus coated, thus adverting adhesion of the rime liable to be deposited in view of the very low coefficient of friction of this material. The same result is obtained by spraying or coating the fin with a product having a low adhesion coefficient, such as polytetrafluoroethylene.

By way of example, a 50 Nm³/hr heating device comprising four tubes of a length of 2.3 m (not treated for radiation) has been made, whereas to obtain the same result with conventional tubes, it was necessary to incorporate at least six tubes of a length of 2.5 m or eight tubes of a length of 2.3 m, the section of the tubes utilised having a heat transfer surface externally amounting to 2.4 m² per linear meter and an internal heat transfer surface amounting to 0.135 m²/linear meter, the whole within a rectangular outline of 200×160 mm and a lower weight per linear meter than 5 kgs.

Figure 4:
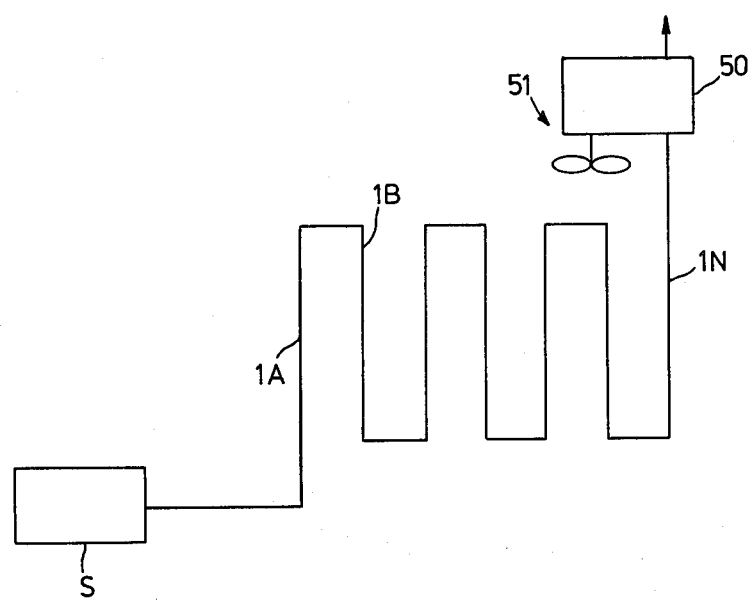
FIG. 4 is a diagrammatic view of an atmospheric heater in accordance with the invention.

The above modifications are diagrammatically shown in FIG. 4: cryogenic liquid is fed from a source S to a first heat exchanger tube 1A having a low adhesion coating on its external fins, then to other tubes 1B, ..., 1N, the external fins of the latter being colored black, all the tubes being connected in series. The gaseous fluid emerging from tube 1N drives the pneumatic motor 50 to a force draught device 51.

The invention is applicable more particularly for heating cryogenic fluids such as nitrogen, oxygen in liquified form.

I claim:

1. A heat exchanger for vaporizing a cryogenic liquid, comprising a tube having external and internal heat transfer fins, at least two said internal fins extending radially toward the tube axis for a distance of at least 0.6R, the other internal fins extending radially toward the tube axis between 0.2R and 0.5R, where R is the internal tube radius, each of at least two said external fins being outwardly extended by two fin-branching webs, each said web being parallel to the immediately adjacent external fin, the distances between outer edges of each pair of adjacent said fin and fin web being substantially equal.

2. A heat exchanger as claimed in claim 1, in which said external fins are in radial alignment with said internal fins.

3. A heat exchanger as claimed in claim 1, in which at most one internal fin out of two is extended radially toward the axis for a distance of at least 0.6R.

4. A heat exchanger as claimed in claim 1, wherein said internal fins are corrugated in a direction along their length.

5. A heat exchanger as claimed in claim 4, in which the pitch of said corrugations is between 0.4R and 2R.

6. A heat exchanger as claimed in claim 1, wherein at least some of said external fins are colored black.

7. A heat exchanger as claimed in claim 1, in which at least one of said external fins has a film of plastic material having a very low coefficient of friction of very low coefficient of adhesion.

8. A heat exchanger as claimed in claim 7, in which said plastic film is selected from the group consisting of PTFE and derivatives PTFE.

9. A heat exchanger as claimed in claim 1, in which the internal diameter of said tube exceeds 20 mm and the radial extent of said internal fins which are extended for a distance at least 0.6R lies between 0.6R and R, inclusive.

10. A heat exchanger as claimed in claim 1, in which the radial extent of said internal fins which extend radially toward the tube axis for a length of at least 0.6R, is less than 0.9R.

11. A heat exchanger as claimed in claim 1, at least one said external fin terminating in a slotted rail-like profile for enclosing an attachment bolt head.

12. A heat exchanger for vaporizing a cryogenic liquid, comprising a tube having external and internal heat transfer fins, at least two said internal fins being extended internal fins and extending radially toward the tube axis for a distance of at least 0.6R, the other internal fins extending radially toward the tube axis between 0.2R and 0.5R, where R is the internal tube radius, each of at least two said external fins being in radial alignment with a respective said extended internal fin and being outwardly extended by two fin-branching webs, each said web being parallel to the immediately adjacent external fin, the distances between outer edges of each pair of adjacent said fin and fin web being substantially equal.

13. A heat exchanger as claimed in claim 12, at least one said external fin terminating in a slotted rail-like profile for enclosing an attachment bolt head.

14. An atmospheric heater for vaporizing a cryogenic liquid, the heater comprising: a plurality of heat exchangers mounted in series, each heat exchanger comprising a tube having external and internal heat transfer fins, at least two said internal fins extending radially toward the tube axis for a distance of at least 0.6R, the other internal fins extending radially toward the tube axis between 0.2R and 0.5R, where R is the internal tube radius, each of at least two said external fins being outwardly extended by two fin-branching webs, each said web being parallel to the immediately adjacent external fin, the distances between outer edges of each pair of adjacent said fin and fin web being substantially equal; and a forced draught device comprising a pneumatic motor fed by fluid in gaseous condition emerging from the heater.

15. An atmospheric heater as claimed in claim 14, wherein at least one said external fin of the last heat exchanger with respect to a direction of flow of said fluid is colored black while said external fins of the first heat exchanger with respect to said direction have a low adhesion coating thereon.

* * * * *